United States Patent
Lustig et al.

(10) Patent No.: US 8,565,364 B2
(45) Date of Patent: Oct. 22, 2013

(54) WATER BASED DISPERSIONS OF BORON OR BORON COMPOUNDS FOR USE IN COATING BORON LINED NEUTRON DETECTORS

(75) Inventors: James Michael Lustig, Mantua, OH (US); Jon Bennett Jansma, Pepper Pike, OH (US)

(73) Assignee: General Electric Company, Schenectady, NY (US)

( * ) Notice: Subject to any disclaimer, the term of this patent is extended or adjusted under 35 U.S.C. 154(b) by 1154 days.

(21) Appl. No.: 12/619,003

(22) Filed: Nov. 16, 2009

(65) Prior Publication Data

US 2011/0116589 A1 May 19, 2011

(51) Int. Cl.
*G01T 3/00* (2006.01)
*G21C 17/00* (2006.01)

(52) U.S. Cl.
USPC ........... 376/155; 376/153; 376/245; 376/254; 250/336.1; 250/390.01

(58) Field of Classification Search
USPC ................. 376/153–155, 245, 254; 250/390.01–390.05, 391, 505.1, 515.1, 250/517.1, 336.1; 428/411.1, 457, 469; 438/510, 542, 546; 75/300, 228, 230, 75/236–238, 244, 255, 252, 254
See application file for complete search history.

(56) References Cited

U.S. PATENT DOCUMENTS

| | | | |
|---|---|---|---|
| 3,827,982 A * | 8/1974 | Hall | 75/228 |
| 3,956,654 A | 5/1976 | Gleason | |
| 4,264,383 A * | 4/1981 | Ostop et al. | 438/546 |
| 6,426,504 B1 * | 7/2002 | Menlove et al. | 250/390.01 |
| 6,545,281 B1 * | 4/2003 | McGregor et al. | 250/390.01 |
| 7,002,159 B2 * | 2/2006 | Lacy | 250/390.01 |
| 7,910,893 B2 * | 3/2011 | Glesius et al. | 250/390.01 |
| 7,952,078 B2 * | 5/2011 | McCormick et al. | 250/390.01 |
| 7,964,852 B2 * | 6/2011 | McCormick | 250/391 |
| 8,084,747 B2 * | 12/2011 | Weissman et al. | 250/390.01 |
| 8,129,690 B2 * | 3/2012 | McCormick et al. | 250/390.01 |
| 2003/0213917 A1 * | 11/2003 | Menlove et al. | 250/390.01 |
| 2007/0269666 A1 * | 11/2007 | Andrus | 428/469 |

FOREIGN PATENT DOCUMENTS

WO WO2008/060148 A2 * 5/2008

* cited by examiner

*Primary Examiner* — Bernarr Gregory
(74) *Attorney, Agent, or Firm* — Cooper Legal Group, LLC

(57) ABSTRACT

A method for providing a boron-lined neutron detector. The method includes providing a boron-containing material and providing water. The method includes mixing the boron-containing material into the water to create a water-based liquid mixture and providing a substrate of a cathode of the neutron detector. The method includes applying the water-based liquid mixture to the substrate of the cathode and removing water from the water-based liquid applied to the substrate to leave a boron-containing layer upon the substrate that is sensitive to neutron impingement. The step of providing a boron-containing material may be to provide the material to include B-10.

20 Claims, 3 Drawing Sheets

WATER BASED DISPERSIONS OF BORON OR BORON COMPOUNDS FOR USE IN COATING BORON LINED NEUTRON DETECTORS

BACKGROUND OF THE INVENTION

1. Field of the Invention

The invention relates to manufacture of neutron detectors, and specifically relates to coating boron lined neutron detectors.

2. Discussion of Prior Art

Recently, high sensitivity neutron detectors for homeland security have become increasingly important and increasingly in demand. Many known neutron detectors utilize He-3, a neutron sensitive material known to provide a detector of high sensitivity. The He-3 is provided within a volume that includes a cathode within a detection arrangement. Recently, the availability of He-3 has been has become insufficient to satisfy the demand associated with high sensitivity neutron detectors. Other than He-3 there are only a few neutron sensitive materials that are useful for constructing a neutron detector, including certain isotopes of uranium, lithium and boron.

Focusing upon boron, the majority (e.g., approximately 80%) of naturally occurring boron is B-11, which has 5 protons and 6 neutrons, and the remainder (e.g., approximately 20%) is boron 10 (B-10), which has 5 protons and 5 neutrons. The B-10 isotope is useful for neutron detection. Thus, for use in a neutron detector, it is typically desirable to enrich the concentration of B-10.

The detection of neutrons is based on the generation of secondary radiations at a converter material. With B-10 ($^{10}$B) as the converter material, the reaction is described as follows when a neutron is captured:

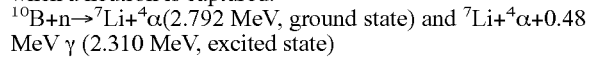

$^{10}$B+n→$^{7}$Li+$^{4}\alpha$(2.792 MeV, ground state) and $^{7}$Li+$^{4}\alpha$+0.48 MeV $\gamma$ (2.310 MeV, excited state)

The energy released by the reaction is approximately 2.310 million electron volts (MeV) in 94% of all reactions (2.792 MeV in the remaining 6%), and equals the energy imparted to the two reaction products (the energy of the captured neutron is negligible by comparison). The reaction products, namely an alpha particle (a) and a lithium nucleus ($^{7}$Li) are emitted isotropically from the point of neutron capture by B-10 in exactly opposite directions and, in the case of the dominant excited state, with kinetic energies of 1.47 MeV and 0.84 MeV, respectively. As such, the use of boron as a neutron sensitive material is known and useful. Herein after boron may be discussed generically with the understanding that the content of B-10 is suitably sufficient.

Focusing for the moment upon the physical construction of neutron detectors, a detector includes an anode and a cathode. One example detector includes a wire extending on an axis for the anode and a cylindrical cathode circumscribing the anode. The cathode is lined with neutron sensitive material such as boron.

Known techniques for providing a boron lining within a neutron detector include the use of borane gas, which is decomposed to provide the boron lining as a precipitate, and the use of mineral oil, which carries boron in a suspension. However, with the increased demand for boron-based neutron detectors, such known techniques may not adequately/effectively/economically satisfy the demand.

A new generation of neutron detector production would be most beneficial.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

One aspect of the invention provides a method for providing a boron-lined neutron detector. The method includes providing a boron-containing material and providing water. The method includes mixing the boron-containing material into the water to create a water-based liquid mixture and providing a substrate of a cathode of the neutron detector. The method includes applying the water-based liquid mixture to the substrate of the cathode and removing water from the water-based liquid applied to the substrate to leave a boron-containing layer upon the substrate that is sensitive to neutron impingement.

Another aspect of the invention provides a method for providing a boron-lined neutron detector. The method includes providing a B-10 containing material, and providing water. The method includes mixing the B-10 containing material into the water to create a water-based liquid mixture and providing a substrate of a cathode of the neutron detector. The method includes applying the water-based liquid mixture to the substrate of the cathode and removing water from the water-based liquid applied to the substrate to leave a B-10 containing layer upon the substrate that is sensitive to neutron impingement.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
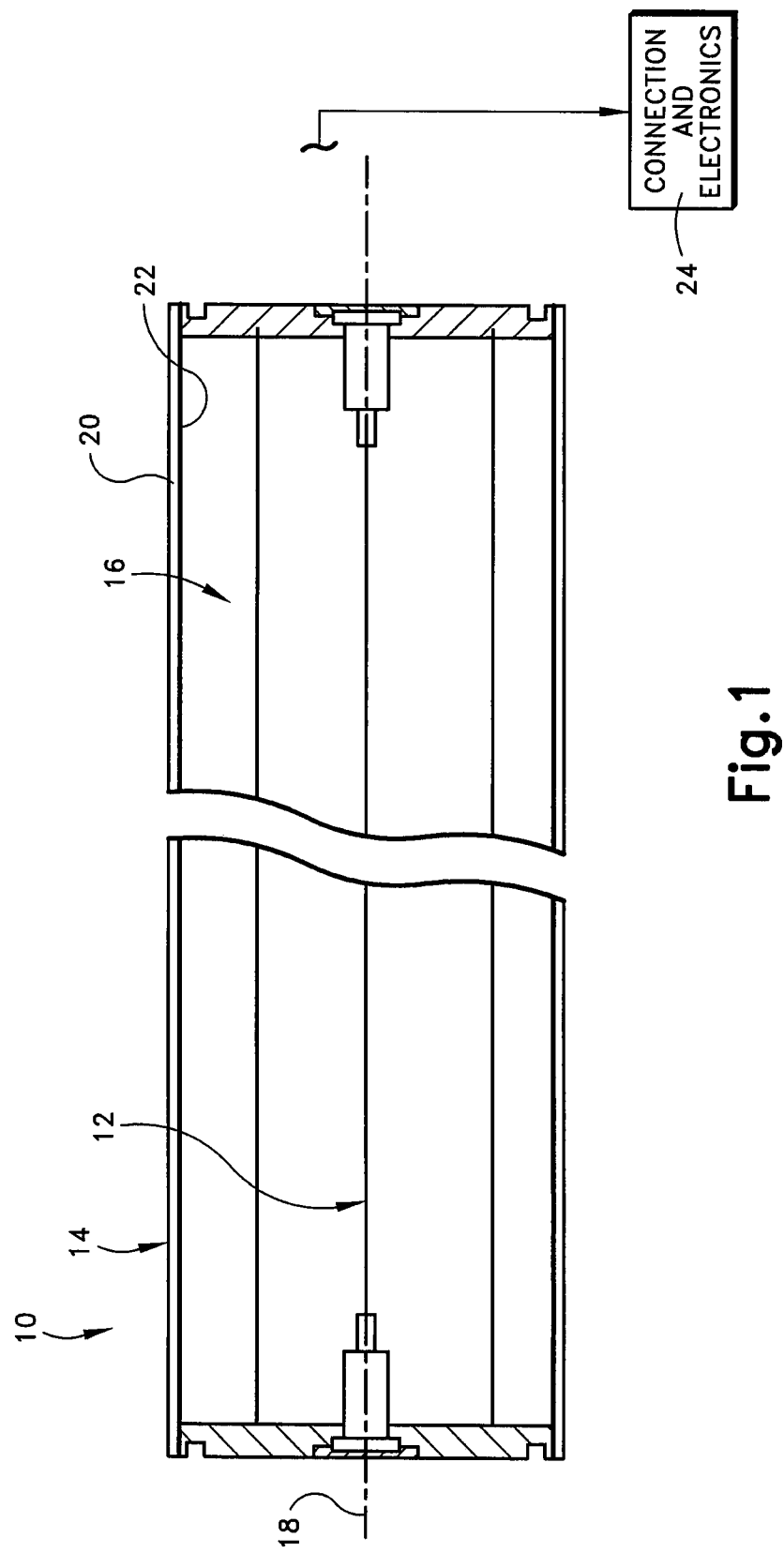
FIG. 1 is a schematic cross-section of an example neutron detector made in accordance with one aspect of the invention.

Example embodiments that incorporate one or more aspects of the invention are described and illustrated in the drawings. These illustrated examples are not intended to be a limitation on the invention. For example, one or more aspects of the invention can be utilized in other embodiments and even other types of methods or devices. Moreover, certain terminology is used herein for convenience only and is not to be taken as a limitation on the invention. Still further, in the drawings, the same reference numerals are employed for designating the same elements.

An example embodiment of a neutron detector 10 made via a method in accordance with one aspect of the invention is shown in FIG. 1. Basically, the neutron detector 10 includes a pair of electrodes, which are an anode 12 and a cathode 14. The anode 12 and cathode 14 are separated from each other within a volume 16. In the shown example the cathode 14 provides part of the outer boundary of the volume 16. The volume 16 is sealed and contains a gas, such as argon with an additive of carbon-dioxide. The anode 12 is electrically conductive and electrically connected to detection electronics as will be appreciated by the person of skill in the art. In the shown example, the anode 12 is elongate and extends along an axis 18 of the neutron detector 10 and the cathode 14 is cylindrical and extends around the anode 12 and the axis 18. In one example, the anode 12 is a wire that is in the range of 0.0254-0.0508 mm (0.001-0.002 inches) in diameter. As mentioned, such a size range is merely an example. Accordingly, such an example should not be considered to be a limitation upon the invention.

Figure 2:
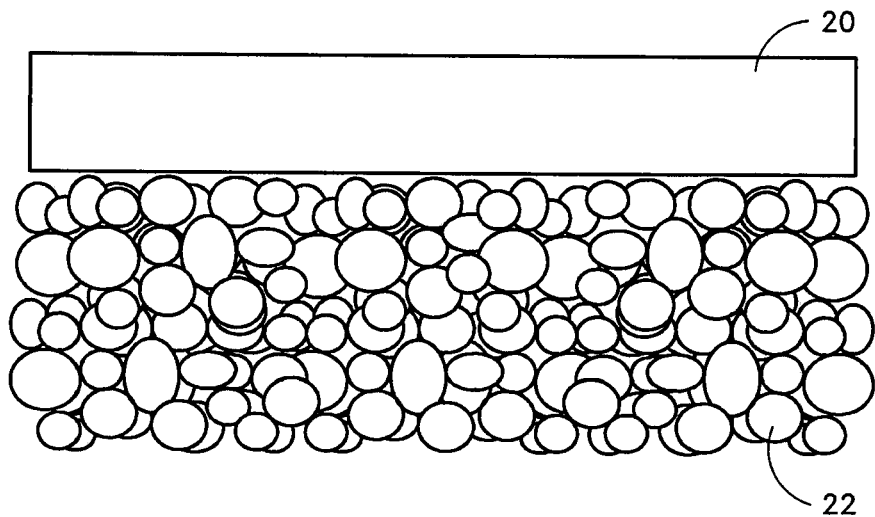
FIG. 2 is an enlarged section of the neutron detector of FIG. 1 and schematically shows a boron coating lined onto a cathode substrate.

The cathode 14 includes a supporting substrate 20 and a layer 22 (FIG. 2) of a neutron sensitive boron material on the substrate. In one specific example, the boron material is enriched to have a high content of B-10. One example of a high content of B-10 is a content of B-10 greater than 90%. In a more specific example, the boron material is ~98% pure boron with an enrichment of 99% content of B-10. Although there is improved sensitivity via use of increased enrichment, in general, a 96% enrichment content of B-10 may be a useful cost/benefit selection.

The layer 22 of the cathode 14 faces (i.e., is exposed to) the anode 12. As such, the layer 22 is an interior face of the cathode 14 which contains boron. Another way of presenting this is that the cathode 14 has an interior face that includes the boron. It is to be appreciated that the layer 22 includes B-10, but may also include other boron isotopes or other materials. Since the B-10 is providing the desired function for neutron detection, the boron-containing layer is referred to as the B-10 or the B-10 layer.

Sensing a neutron is accomplished by a current pulse that occurs between the anode 12 and cathode 14, through the gas, when a neutron impinges upon the B-10 boron of the cathode. When a neutron is absorbed by a B-10 atom in the layer 22 on the cathode 14, an alpha particle (i.e., a helium-4 nucleus) and lithium-7 nucleus—both positively charged—are generated and are ejected in opposite directions along a straight line, the orientation of which is random. One of these particles will not emerge from the B-10 layer because its direction of motion is towards the cathode. The other particle moves towards the gas/coating interface from which it will emerge if it has enough energy. When one of these nuclear particles passes into the gas within the volume 16, it ionizes the gas.

The negative ion particles, electrons, drift towards the anode 12 and as the negatively charged particles approach sufficiently near the anode (e.g., within 1-3 anode diameters) the negatively charged particles accelerate to the point of generating even more charge. This is called "gas gain" and it generates enough charge so that the resulting current has a perceptible effect within an associated electronics arrangement 24 (shown schematically within FIG. 1) operatively connected to the neutron detector 10. Thus, the current at the anode 12 is detectable and quantifiable. It is to be appreciated that in one example, the associated electronics arrangement 24 includes an electronic amplifier in order to aid in processing the current generated at the anode. It is to be appreciated that general operation/structure of neutron detectors and associated electronics arrangements will be appreciated by the person of skill in the art.

Figure 3:
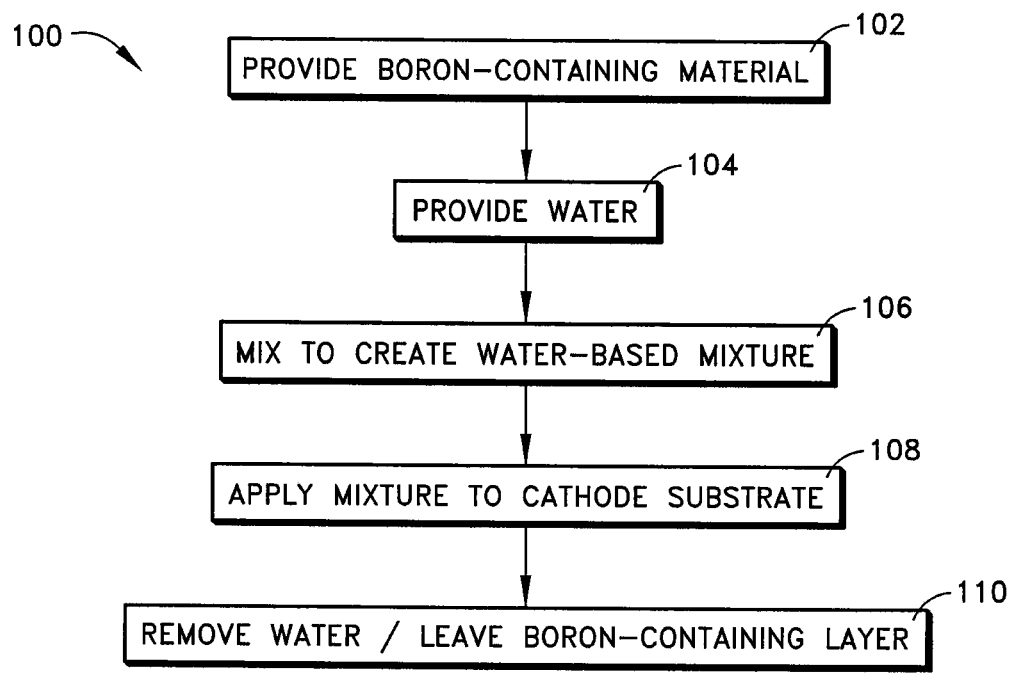
FIG. 3 is a top-level flow chart for a method in accordance with an aspect of the present invention.

In accordance with one aspect of the present invention, the B-10 layer 22 is provided via the use of applying the B-10 within an aqueous-based liquid (e.g., a water-based dispersion of B-10). Hereinafter the phrase "water-based" is used with the understanding that the phase is to be broadly interpreted to include various mixtures, solutions, suspensions, dispersions and the like that includes water as a primary liquid, but that other liquids may be present. Also, hereinafter the term "mixture" is used with the understanding that the term means various mixtures, solutions, suspensions, dispersions and the like. FIG. 3 shows an example of a top-level flow chart for an example of a method 100 in accordance with an aspect of the present invention. At an initial step 102, boron-containing material is provided. The material includes that desired B-10. Water is provided at step 104. The boron-containing material is mixed with the water at step 106. A water-based mixture is thus provided. In turn, the water-based mixture is applied to the substrate of the cathode at step 108. Finally, at step 110, water is removed from the water-based liquid that was applied to the substrate which leaves a boron, and specifically B-10, containing layer upon the substrate. The layer 22, which includes the B-10, is sensitive to neutron impingement.

It is to be appreciated that the water-based mixture may be varied. One example water-based mixture ingredient listing is provided as follows, but should not be taken as a limitation upon the present invention. The ingredients are Boron-10 metal powder (e.g., from EaglePicher or Boron Products, which is a division of Ceradyne), enriched and with particle size distribution of minimum 75% less than 1 micron, minimum 95% less than 3 microns and balance less than 15 microns, DI Water >2.0 MOhm, Dow N3000 polyethelyene oxide, Ciba Dispex A40, Boric acid, and Elmers washable school glue #E 304 or equivalent.

It is to be appreciated that various parameters may be used and varied within the method for providing a boron-lined neutron detector via water-based liquid mixture and still be within the scope of the present invention. Table 1 provides ingredient lists for some examples. It is to be appreciated that these examples and the ingredients provided therein are not specific limitations upon the present invention.

TABLE 1

| Ingredients | Example 1 | Example 2 | Example 3 | Example 4 |
|---|---|---|---|---|
| Water (cc) | 300 | 100 | 200 | 100 |
| F108 (g) | 10 | | | |
| W360 (g) | 10 | | | |
| Boron Powder (g) | 30 | 10 | 20 | 10 |
| N3000 polyox (5%) (g) | 51 | 10 | 20 | 10 |
| CO530 (10%) (g) | 5 | | | |
| Dispex A40 (g) | 0.6 | 0.2 | 0.4 | 0.2 |
| Defoamer (drops) | X | | | |
| Milled (ball Zr) | X | X-pre | X-pre | X-pre |
| Elmers glue (g) | | 2.9 | 5.8 | |
| HCl (g) (37%) | 1 | | | |
| boric acid 3.1% (g) | | 2.5 | | |
| HS-211 | | | | 1.66 |
| Total mass | 406.6 | 113.1 | 226.2 | 120.2 |

Wherein:
Water is provided as the basic volume for the associated values of other ingredients.
F108 is a surfactant made by BASF and chemically is a block copolymer (tri-block) with polypropylene oxide as the center block and polyethylene oxide as the end blocks, and with a Molecular Weight (MW) of 18,000.
W630 is a water dispersion of aluminium oxide particales, with the aluminium oxide content of 30% (weight) and a small amount of acetic acid utilized to adjust pH (added by the manufacturer). The particle size of the aluminium oxide is 50-100 nanometers (median) an manufactured by Evonik/Degussa Corporation.
Boron powder is Boron with B-10 (90+%).
N3000 polyox is a polyethylene oxide made by Dow, with a MW of 300,000 (weight average) and which functions as a thickener.
CO530 (Igepal) is a surfactant one of a family of surfactants in the akylphenylethoxylate category, specifically, nonylphenylethoxylate, with the ethoxylate of 6 repeat units (average). HLB = 7, and produced by Rhodia.
Dispex A40 is a hydrophilic, narrow-fraction ammonium salt dispersant, which is polyacrylic acid (MW~5000) neutralized with ammonia.
Defoamer is BYK-033 made by BYK-Chemie (German), and is an emulsion of alkylamines + mineral oil, and is a mild silicone-free defoamer.
Milled "X" means that all ingredients were mixed together and then milled, X-pre means that the boron powder, the Dispex and ¼ to ⅓ of the total water were milled using milling media, and then the remaining water and other ingredients were added and mixing was continued without milling media.
Elmers glue acts as a binder and possibly as a surfactant.
HCl = hydrogen chloride, added to try to provide better adhesion to the aluminium by theoretically etching some of the oxide layer. It was also used to see the effects of pH change.
HS-211 = polyvinylacetate/polyvinyl alcohol mixture which acts as a binder and surfactant binders can also have roles as thickeners and surfactants Wherein:
Water is provided as the basic volume for the associated values of other ingredients.
F108 is a surfactant made by BASF and chemically is a block copolymer (tri-block) with polypropylene oxide as the center block and polyethylene oxide as the end blocks, and with a Molecular Weight (MW) of 18,000.

W630 is a water dispersion of aluminum oxide particles, with the aluminum oxide content of 30% (weight) and a small amount of acetic acid utilized to adjust pH (added by the manufacturer). The particle size of the aluminum oxide is 50-100 nanometers (median) an manufactured by Evonik/Degussa Corporation.

Boron powder is Boron with B-10 (90+%).

N3000 polyox is a polyethylene oxide made by Dow, with a MW of 300,000 (weight average) and which functions as a thickener.

CO530 (Igepal) is a surfactant one of a family of surfactants in the alkylphenylethoxylate category, specifically, nonylphenylethoxylate, with the ethoxylate of 6 repeat units (average). HLB=7, and produced by Rhodia.

Dispex A40 is a hydrophilic, narrow-fraction ammonium salt dispersant, which is polyacrylic acid (MW~5000) neutralized with ammonia.

Defoamer is BYK-033 made by BYK-Chemie (German), and is an emulsion of alkylamines+mineral oil, and is a mild silicone-free defoamer.

Milled: "X" means that all ingredients were mixed together and then milled, X-pre means that the boron powder, the Dispex and ¼ to ⅓ of the total water were milled using milling media, and then the remaining water and other ingredients were added and mixing was continued without milling media.

Elmers glue acts as a binder and possibly as a surfactant.

HCl=hydrogen chloride, added to try to provide better adhesion to the aluminum by theoretically etching some of the oxide layer. It was also used to see the effects of pH change.

HS-211=polyvinylacetate/polyvinyl alcohol mixture which acts as a binder and surfactant *binders can also have roles as thickeners and surfactants It is to be noted that the examples of Table 1 provide for useful results. For example, the water based mixture of Example 4 when used to provide the layer within a 48 inch long and one inch diameter tubular aluminum material substrate 20 yielded a fairly uniform layer 22. Specifically, upon testing, variance in sensitivity through the length was only approximately 6%.

It is to be appreciated that the amount of material providing the layer 22 can be varied. As a corollary, the thickness of the layer 22 can be varied. In one example, a loading provided by the layer 22 onto the substrate 20 of between about 0.1 mg/cm$^2$ and about 1.0 mg/cm$^2$ in boron is provided. A more specific loading range would be about 0.2-0.6 mg/cm$^2$ in boron. An even more specific loading range would be about 0.35-0.4 mg/cm$^2$ in boron. It is contemplated that different, and specifically higher, loading is possible. In part it, the amount of boron loading may dependant upon how many detectors are ultimately provided within an array. For example, more detectors within an array might suggest that a thinner coating would be beneficial. There is a trade-off in coating thickness between catching as many neutrons as possible in an individual detector and allowing for greater neutron transparency to allow for capture in other detectors in the array for greater overall neutron sensitivity.

It is to be noted that other ingredients may be added and/or substituted. Also, some of the ingredients listed within the presented examples may be omitted and/or substituted within yet other examples. For example, fumed silica may be part of the ingredients. E160, which is a polyethylene oxide made by Meisai Chemical (Japan) and a MW of 1,600,000, may be part of the ingredients. Also, the ingredients may include PMV#304, which is a polyvinylmethylether/maleicanhydride alternating copolymer, a MW of approximately 1,000,000, made by GAF/Rhodia and functioning as a binder. Also, the ingredients may include EM15+c38, which is a random copolymer of ethylacrylate and methacrylic acid, a MW of about 1,000,000, made by Ciba and functioning as a binder. Possible alternative surfactants are Pluronic PPO_PEO block copolymer surfactants such as F108, L92, P104 (from BASF), Surfynol/Dynol acetylenic diol surfactants (from Air Products), and Ethox 1437—nonionic PPO-PEO variations (from Ethox Chemicals). Possible alternative dispersants are Daxad polymethacrylic acid, both sodium and ammonium salts (from WR Grace) or Sodium hexametaphosphate.

Possible alternative thickeners are other MW Polyox grades, up to MW of approximately 7,000,000, Dow Polyglycols, Hydroxy Ethyl cellulose, Polyacrylimides, Polyvinyl alcohol. Possible alternative binders include Colloidal alumina (Degussa/Evonic, Cabot), Colloidal silica (Degussa/Evonic, Cabot), and Colloidal graphite (Acheson colloids).

It is to be appreciated that mixing of the water-based mixture may be varied. One example procedure is provided as follows, but should not be taken as a limitation upon the present invention. The following procedure is intended for suspending 30 grams of enriched boron, in a mixture that is approximately 300 milliliters. Larger or smaller batches may be made with this procedure with the appropriate attention to the change in scale.

In a plastic weighing dish weigh 30.0 grams of the B10 powder. Transfer this powder to a 500 milliliter nalgene bottle. 85.0 grams of de-ionized (DI) water is added to the nalgene bottle. 0.6 grams of Dispex A40 is added to the nalgene bottle using a disposable transfer pipette. The bottle is capped and the mixture is gently swirled for approximately 15 seconds. The bottle is opened and clean milling media is added such that it fills to within about ½ inch of the liquid surface. The bottle is capped and placed on a roller for 45 minutes to 1 hour. The person operating of the roller device should be trained to set the roller speed properly and listen for the action of the milling media to ensure that proper milling action is taking place. Subsequently, the mixture and milling media are poured into a transfer bottle. Using the plastic filter strainer, the mixture is poured back into the mixing bottle, separating out the milling media in the strainer. An additional 215.0 g of DI water is used to rinse the transfer bottle and the milling media into the mixing bottle. This should bring the mixture to 300 grams of total of DI water. Thoroughly rinse the transfer bottle and milling media. Store the cleaned milling media in DI water. Next, 30.0 grams of 5% N3000 is added to the mixture. 7.5 grams of 3.1% boric acid in DI water mixture is added to the mixture. 8.7 grams of Elmers glue or equivalent is added. The mixture is capped and placed on the rollers for a minimum of 30 minutes prior to use. The mixture should be kept on rollers when not in use. The maximum time that the mixture should be permitted to set before use without some form of agitation is 30 minutes.

Figure 4:
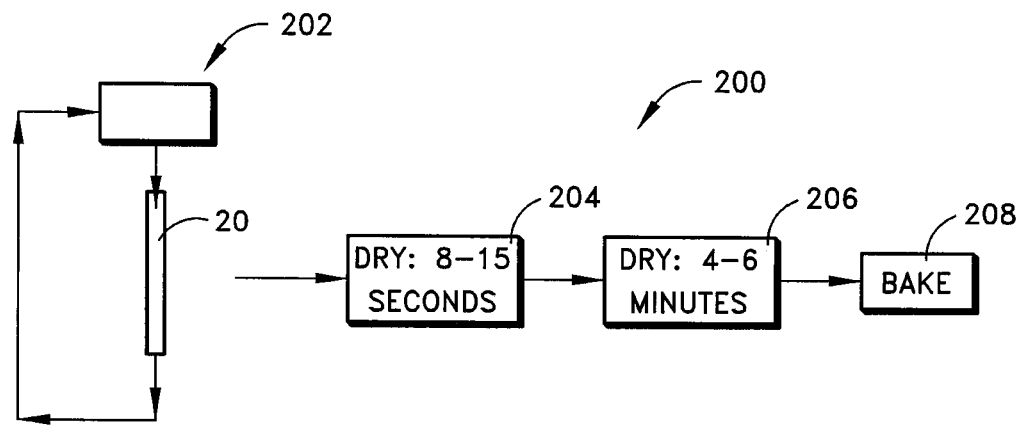
FIG. 4 is a block diagram showing steps of an example method in accordance with an aspect of the present invention.
Figure 5:
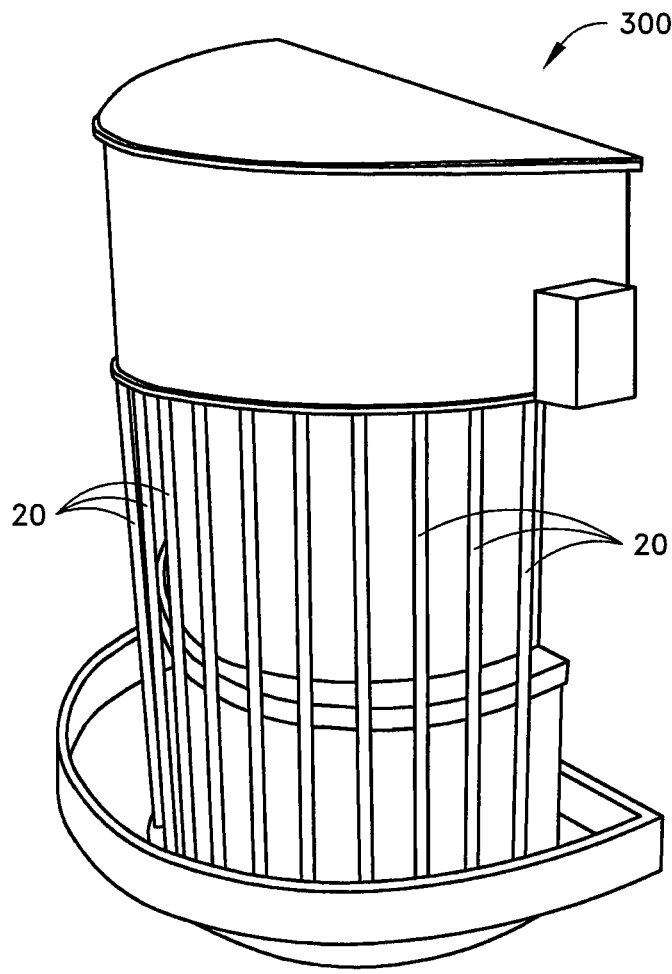
FIG. 5 is a schematic picture of an example of plural elongate tubes of cathode substrate material being filled with a water based mixture that includes boron-containing material during the example method indicated by FIG. 4.

It is to be appreciated that the method of applying the water-based mixture may have many variations within the scope of the invention. For example, FIG. 4 shows a block diagram for a portion of a method 200 that produces neutron detectors that are tubular in general shape. Moreover, the block diagram is associated with depositing the B-10 layer 22 onto cathode substrate material (i.e., providing a substrate 20) that has a bulk length that is later cut to a shorter length for individual neutron detectors. At block 202 of the method 200, a supply of water-based liquid mixture that contains B-10 is premade (i.e., water and material are provided and mixed together) provided within a tank. The liquid mixture is supplied into the elongate, tubular substrate material 20 to thus apply the mixture to the substrate. FIG. 5 is an illustration showing plural tubular substrates 20 supported by and connected to a structure 300 that circulates the liquid mixture into the substrates via supply and exhaust valves. Supplying of the water-based liquid mixture may be accomplished is several ways. For example, the liquid mixture may flow into the tubular substrate via a down flow (e.g., gravity fed). Alternately, the liquid mixture may be pumped-up or even vacuumed up into the tubular substrate. The liquid mixture thus is on contact with the cathode substrate.

With the liquid mixture in contact with the substrate, the material, and in particular the B-10, can engage and adhere to the surface(s) of the substrate. In due course, the excess liquid mixture is removed (e.g., drained) from the tubular substrate at function block 204 (FIG. 4). An amount of the liquid mixture, and in particular the material within the mixture, remains in contact with the substrate as a coating. It is to be appreciated that water is present within the liquid mixture coating that remains in contact with the tubular substrate. In other words, the liquid mixture coating is moist. A next step is to remove the remaining water to leave just a layer. As such, drying is performed at function block 206. Such, drying may be done via application of heat, air flow or other drying actions. Subsequently, to aid in creation of a layer that has a desired level of durability, the substrate with a layer is baked at function block 208. Subsequently, the B-10 coated tubular substrate can be cut to length and further construction of the neutron detector(s) can occur.

Turning to some examples of details concerning the later process steps, drying is done to remove the water vehicle from the coating and thus converts the liquid suspension into a dried layer 22 on the substrate 20. In one example, air heated to 200° F. is blown down the center of the coated cylindrical substrate at a velocity of 1000 ft/min. This drying technique provides several advantages over simply air drying at room temperature or drying in an oven. The heated convective flow, with flow direction from top to bottom, and cylindrical substrates held in a vertical orientation provides for the creation of a uniform layer 22 that is rapidly dried. Tubes 4 feet in length can typically be dried to a solid coating after approximately 3 minutes. The rapid drying helps to prevent separation of the suspended particles from the water vehicle prior to drying, helping to prevent a condition that could cause "rivers" to form in the coating. Proper control of the drying parameters can strongly affect the top-to-bottom uniformity.

Other alternative methods that could be used for providing a uniform coating would include a controlled withdrawal rate of the mixture from the tube, or a drier that rotated the tube to maintain uniformity.

With regard to baking one possible function is to remove excess organics that would not be removed during the relatively lower temperature drying process. Temperature, and potentially the atmosphere (air, or purged, or vacuum) would be selected to yield out-gassing of the undesired organic components. Some of the organics might be left behind intentionally to act as binders. It may be beneficial that the organics not outgas over time once in the hermetic volume. It appears that a 225° C. under high vacuum ($5*10^{-5}$ torr or less) for a period of at least 4 hours may be sufficient for baking.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

The invention claimed is:

1. A method for manufacturing a boron-lined neutron detector having a cathode and an anode, the cathode being sensitive to neutron impingement to cause current at the anode that provides for neutron detection, the method including:
   providing a boron-containing material;
   providing water;
   mixing the boron-containing material into the water to create a water-based liquid mixture;
   providing a substrate of the cathode of the neutron detector;
   applying the water-based liquid mixture to the substrate of the cathode at a location for neutron impingement to cause the current at the anode that provides for neutron detection;
   removing water from the water-based liquid applied to the substrate to leave a boron-containing layer upon the substrate that is sensitive to the neutron impingement to cause the current at the anode.

2. A method as set forth in claim 1, wherein the step of providing a boron-containing material includes providing the material to include B-10.

3. A method as set forth in claim 1, wherein the step of providing a boron-containing material includes providing the material to include at least one binder.

4. A method as set forth in claim 1, wherein the step of providing a boron-containing material includes providing the material to include at least one thickener.

5. A method as set forth in claim 1, wherein subsequent to the step of removing water the method further includes the step of drying the layer.

6. A method as set forth in claim 5, wherein subsequent to the step of drying the layer, the substrate and the layer are baked.

7. A method as set forth in claim 1, wherein the step of providing a substrate includes providing the substrate as a hollow cylindrical with an interior so that the hollow cylinder can receive the anode therein, and the step of applying the water-based liquid mixture to the substrate of the cathode at a location for neutron impingement to cause the current at the anode that provides for neutron detection includes applying the mixture to the interior of the hollow cylinder so as to face the anode received within the hollow cylindrical.

8. A method as set forth in claim 1, wherein the step of providing a boron-containing material includes providing the material to include B-10, and the steps of providing a boron-containing material including B-10 and removing water from the water-based liquid applied to the substrate to leave a boron-containing layer are such that a loading of B-10 is between about 0.1 mg/cm$^2$ and about 1.0 mg/cm$^2$ within the boron-containing layer upon the substrate.

9. A method as set forth in claim 8, wherein the loading of B-10 is between about 0.2 mg/cm$^2$ and about 0.6 mg/cm$^2$.

10. A method as set forth in claim 9, wherein the loading of B-10 is between about 0.35 mg/cm$^2$ and about 0.4 mg/cm$^2$.

11. A method for manufacturing a boron-lined neutron detector having a cathode and an anode, the cathode being sensitive to neutron impingement to cause current at the anode that provides for neutron detection, the method including:
   providing a B-10 containing material;
   providing water;
   mixing the B-10 containing material into the water to create a water-based liquid mixture;
   providing a substrate of the cathode of the neutron detector;

applying the water-based liquid mixture to the substrate of the cathode at a location for neutron impingement to cause the current at the anode that provides for neutron detection;

removing water from the water-based liquid applied to the substrate to leave a B-10 containing layer upon the substrate that is sensitive to the neutron impingement to cause the current at the anode.

12. A method as set forth in claim 11, wherein the step of providing a B-10 containing material includes providing the material to include boron that contains at least 90% B-10.

13. A method as set forth in claim 11, wherein the step of providing a B-10 containing material includes providing the material to include at least one binder.

14. A method as set forth in claim 11, wherein the step of providing a boron-containing material includes providing the material to include at least one thickener.

15. A method as set forth in claim 11, wherein subsequent to the step of removing water the method further includes the step of drying the layer.

16. A method as set forth in claim 15, wherein subsequent to the step drying the layer, the substrate and the layer are baked.

17. A method as set forth in claim 11, wherein the step of providing a substrate includes providing the substrate as a hollow cylindrical with an interior so that the hollow cylinder can receive the anode therein, and the step of applying the water-based liquid mixture to the substrate of the cathode at a location for neutron impingement to cause the current at the anode that provides for neutron detection includes applying the mixture to the interior of the hollow cylinder so as to face the anode received within the hollow cylindrical.

18. A method as set forth in claim 11, wherein the steps of providing a B-10 containing material and removing water from the water-based liquid applied to the substrate to leave a B-10 containing layer are such that a loading of B-10 is between about 0.1 $mg/cm^2$ and about 1.0 $mg/cm^2$ within the B-10 containing layer upon the substrate.

19. A method as set forth in claim 18, wherein the loading of B-10 is between about 0.2 $mg/cm^2$ and about 0.6 $mg/cm^2$.

20. A method as set forth in claim 19, wherein the loading of B-10 is between about 0.35 $mg/cm^2$ and about 0.4 $mg/cm^2$.

* * * * *